United States Patent [19]

Ngai et al.

[11] Patent Number: 5,482,536
[45] Date of Patent: Jan. 9, 1996

[54] APPARATUS FOR CONTAINMENT AND SCRUBBING OF TOXIC GAS FROM A LEAKAGE LOCATION AND METHOD THEREFOR

[75] Inventors: Eugene Y. Ngai, Whitehouse Station; Lester S. Gerver, Belle Mead, both of N.J.

[73] Assignee: Solvay Specialty Chemicals, Inc., Fairfield, N.J.

[21] Appl. No.: 226,318

[22] Filed: Apr. 12, 1994

[51] Int. Cl.⁶ ................................................. B01D 53/04
[52] U.S. Cl. ................................ 95/131; 95/132; 95/133; 95/137; 95/142; 96/108; 96/147; 55/274; 55/467; 55/468
[58] Field of Search ................ 95/131–133, 135–137, 95/141–143; 96/127, 128, 131–133, 140, 142, 147; 55/274, 356, 357, 383, 385.1, 385.4, 467, 468, 472

[56] References Cited

U.S. PATENT DOCUMENTS

| | | | |
|---|---|---|---|
| 1,821,549 | 9/1931 | Hornor et al. | 96/132 X |
| 2,746,845 | 5/1956 | Guide | 96/132 X |
| 2,796,143 | 6/1957 | Longenecker et al. | 96/131 |
| 2,965,196 | 12/1960 | Rich, Jr. | 55/274 X |
| 3,731,678 | 5/1973 | Pyzel | 96/132 X |
| 3,775,951 | 12/1973 | Eicholz et al. | 55/467 X |
| 3,841,484 | 10/1974 | Domnick | 55/274 X |
| 3,942,524 | 3/1976 | Li et al. | 96/131 X |
| 3,976,050 | 8/1976 | Glasser et al. | 55/74 X |
| 4,018,568 | 4/1977 | Brewer | 96/127 X |
| 4,494,666 | 1/1985 | Cooper et al. | 220/3 |
| 4,512,245 | 4/1985 | Goldman | 96/142 |
| 4,538,361 | 9/1985 | Gresens | 55/468 X |
| 4,625,627 | 12/1986 | Livanos et al. | 98/32 |
| 4,741,697 | 5/1988 | Herbison | 96/131 X |
| 4,790,860 | 12/1988 | Sexton | 55/274 X |
| 4,963,166 | 10/1990 | Hoyt et al. | 96/132 |
| 5,047,072 | 9/1991 | Wertz et al. | 55/274 X |
| 5,086,804 | 2/1992 | Ngai | 55/274 X |
| 5,125,939 | 6/1992 | Karlsson | 96/142 |

FOREIGN PATENT DOCUMENTS

| | | | |
|---|---|---|---|
| 55-005768 | 1/1980 | Japan | 96/131 |
| 55-039224 | 3/1980 | Japan | 96/140 |
| 56-076223 | 6/1981 | Japan | 96/132 |
| 56-150417 | 11/1981 | Japan | 96/132 |

*Primary Examiner*—Robert Spitzer
*Attorney, Agent, or Firm*—Willian Brinks Hofer Gilson & Lione

[57] ABSTRACT

An apparatus for containing and scrubbing toxic or corrosive gases from a leaking pipe or cylinder is provided. A gas passageway attaches at one end to a leakage location on a pipe or cylinder, and at the other end to an air operated exhauster. The air operated exhauster, through the input of a non-flammable purge gas, creates an exhaust flow from the leakage location to a drum which is attached to the air operated exhauster. The drum contains a scrubbing media which, when it contacts the leaked gas, cleans or removes the harmful component, thus allowing release to the atmosphere of the cleaned air.

20 Claims, 3 Drawing Sheets

APPARATUS FOR CONTAINMENT AND SCRUBBING OF TOXIC GAS FROM A LEAKAGE LOCATION AND METHOD THEREFOR

BACKGROUND OF THE INVENTION

1. Field of the Invention

The present invention relates to devices for scrubbing toxic gases which flow from a gas leak on, for example, a gas cylinder or a gas flow pipe. In particular, the present invention relates to portable, self-contained emergency response devices for gas leakage containment and scrubbing which are useful for temporarily controlling and containing gas leaks during emergency situations.

2. Description of the Prior Art

The extensive use of toxic and corrosive gases in industry has led to problems which occur upon leakage of gases in storage or flow system devices. In the case of gas cylinders, increasing government regulations on the handling of gas cylinders has occurred, with a special emphasis on emergency situations such as leaks from the head or valve of such a cylinder. The use of toxic and corrosive gases in the chemical and semiconductor industries has led to similar types of regulations for gas cylinders and flow systems.

Recently, emphasis has been placed on developing pre-plans to deal with emergency situations involving these gas cylinder or flow systems, leading to efforts in the industry to develop procedures and equipment to control a leakage problem if one should occur. A number of devices have been developed for use in controlling leaks of toxic or corrosive gases.

For example, in U.S. Pat. No. 5,086,804 to Ngai, an emergency security device for the head of a leaking gas cylinder is provided. In Ngai, a cap is equipped with a threaded collar adapted to be tightly engaged onto a screw thread provided on the head of a leaking cylinder. A sealing ring is disposed in the cap to provide an airtight seal between the cap and the cylinder after engagement with the screw thread. An inlet port in the cap allows for feeding an inert purge gas into the cap and an outlet port is connected to a scrubbing material which irreversibly reacts with the leaking gas.

In U.S. Pat. No. 4,625,627 to Livanos, a ventilated cabinet for containing gas supply vessels is provided. In Livanos, a gas cabinet for enclosing one or more compressed gas cylinders is ventilated for rapid removal of any gas leaked from the cylinders. The cabinet has a perforated plate as its floor which is used as an air inlet to allow airflow through the interior of the cabinet. A tapered roof has an exhaust port which may be connected to a plant ventilation system for removing the exhausted air from the cabinet.

U.S. Pat. No. 4,494,666 illustrates a device wherein the leaking gas cylinder is completely introduced into a high pressure containment vessel which is then transported to a safe area for disposal. However, these vessels are expensive and for larger cylinders they are heavy and cumbersome.

U.S. Pat. No. 3,976,050 illustrates a device for absorbing exhaled radioactive gases using a radioactive xenon gas trap and an activated carbon adsorbent. Absorbent filled containers are connected in series so that the absorbent solids in each container are completely out of contact with each other.

A chlorine kit "A" contains a pressure cap assembly which can seal the valve assembly of a chlorine cylinder with the use of a set of chains connected to the base of the cylinder. Such a device is effective but limited to low vapor gases, such as sulfur dioxide or chlorine. It is not generally useful for gases such as arsine or hydrogen chloride.

None of the patents and devices described above provides the important advantages of a portable and self-contained leakage containment and scrubbing means which is easily used for on-site scrubbing of a variety of toxic or corrosive gases. Moreover, none of the patents and devices described above provides the capability to such a portable and self-contained device to scrub a variety of toxic or corrosive gases in an atmosphere which limits the danger of explosion.

SUMMARY OF THE INVENTION

It is an object of this invention to provide a device for containing and scrubbing toxic or corrosive gases through a convenient, easily used, self-contained and portable method.

It is a further object of this invention to provide a device for containing and scrubbing toxic or corrosive gases which is useful for quickly treating a variety of different gases on site, thus decreasing the danger inherent in such leaks.

It is a further object of the present invention to provide a portable and convenient device for containing and scrubbing toxic or corrosive gases flowing from a leak which allows for scrubbing the gases in an explosion-proof environment.

It is a further object of the present invention to provide for a portable and convenient device for containing and scrubbing toxic or corrosive gases which allows for controlling exhaust speed of a flow of gas through a scrubbing media, thus ensuring complete cleaning of leaked gas.

According to the invention, an apparatus for containing and scrubbing a leaked gas flowing from a gas leakage location is provided comprising: a gas passageway which is attachable to the gas leakage location at an end of the passageway; a gas suction means for drawing leaked gas through the gas passageway; and a drum attached to the gas passageway at an end opposite the end which is attachable to the gas leakage location, the drum comprising therein a scrubbing media.

Also according to the invention, a method for containing and scrubbing leaked gas flowing from a gas leakage location is provided comprising: providing a gas passageway which is attachable to the gas leakage location at an end of the passageway; providing a gas suction means for drawing leaked gas through the gas passageway; and providing a drum attached to the gas passageway at an end opposite the end which is attachable to the gas leakage location, the drum comprising therein a scrubbing media; wherein the gas passageway is attached to a gas leakage location and the gas suction means draws the leaked gas through the gas passageway and through the drum comprising the scrubbing media thereby cleaning the leaked gas to render it safe for environmental release.

Preferably, the gas suction means comprises an air operated exhauster. More preferably, the air operated exhauster utilizes a non-flammable gas to cause an exhaust flow from the gas leakage location through the drum having therein a scrubbing media.

As pointed out in greater detail below, an advantage of this invention is that a portable, self-contained containment and scrubbing apparatus is provided which allows for the rapid response to leakage problems involving toxic or corrosive gases.

A further advantage of the present invention is that a portable, self-contained containment and scrubbing apparatus is provided which operates in an explosion-proof environment.

Yet another advantage of the present invention is that a portable and convenient device for containing and scrubbing toxic or corrosive gases is provided which allows for controlling the exhaust speed of a flow of gas through a scrubbing media, thus ensuring complete cleaning of leaked gas.

The invention itself, together with further objects and attendant advantages, will best be understood by reference to the following detailed description taken in conjunction with the accompanying drawings.

DETAILED DESCRIPTION OF THE INVENTION

Figure 1:
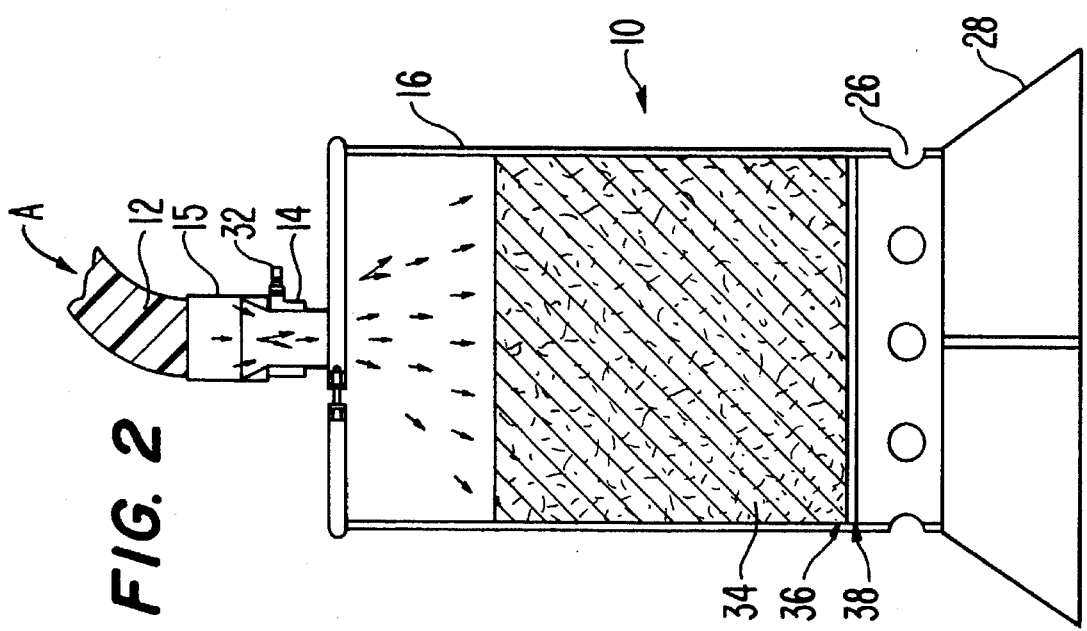
FIG. 1 illustrates a side view of the containment and scrubbing apparatus according to the present invention.

Turning now to the drawings, FIG. 1 illustrates a side view of a preferred embodiment of the containment and scrubbing apparatus 10 according to the present invention while not in use. As shown in FIG. 1, the containment and scrubbing apparatus 10 comprises a gas passageway, or flexible hose 12, a gas suction means, or air operated exhauster 14, and a drum 16.

The flexible hose 12 is conveniently stored by wrapping around the drum 16 on storage hooks 13. The flexible hose 12 comprises on one end a connection means, or exhaust sheath 15.

The air operated exhauster 14 is positioned so as to extend from the top of the drum 16. The air operated exhauster 14 includes a connection means, or quick connect valve 32.

The drum 16 comprises a pressure gauge 18 which measures the pressure in the drum 16. A cover bolt 20 and clamp 22 provide for tightening a cover 24 onto the top of the drum 16. The removable nature of the cover 24 allows for convenient changing or replacing the scrubbing media (not shown) in the interior of the drum 16 depending on the application desired. Vent holes 26 are located at the bottom of the drum 16. As shown in FIG. 1, the drum 16 includes a stand, or rolling ring 28, which allows convenient transport of the containment and scrubbing apparatus 10. By tilting, the entire apparatus 10 may be rolled on the edge of the stand 28.

Figure 2:
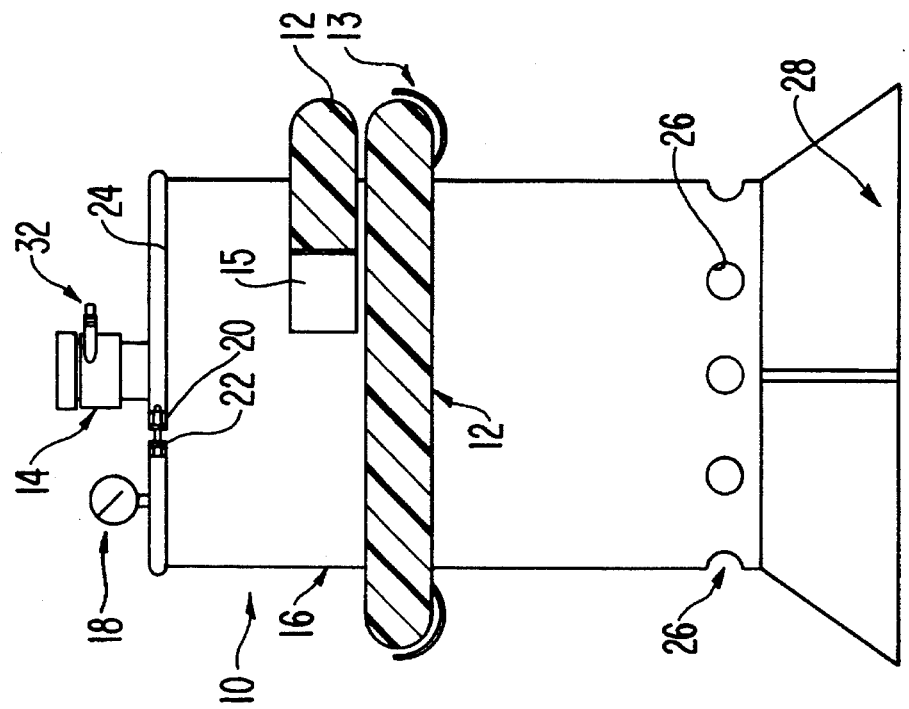
FIG. 2 illustrates a cross-sectional view of the containment and scrubbing apparatus according to the present invention.

Turning to FIG. 2, a cross-sectional view of a preferred embodiment of the containment and scrubbing apparatus 10 according to the present invention is illustrated while in use. During operation of the apparatus 10, the gas flowing from the leakage location on the pipe or cylinder, or leaked gas, is drawn from the leak through the flexible hose 12 to the scrubbing media 34 in the drum 16. As shown in FIG. 2, the flexible hose 12 is attached to the air operated exhauster 14 by connection to the exhaust sheath 15 at one end of the flexible hose 12. The connection between the air operated exhauster 14 and the exhaust sheath 15 should be secure and resistant to corrosion by gases to ensure that there is no release of gas from the flexible hose 12 during containment operation.

The opposite end (not shown) of the flexible hose 12 from the exhaust sheath 15 is connected to the leakage location of a cylinder or gas pipe. During operation, an external air source of compressed purge gas (not shown) is connected to the quick connect valve 32 to cause draw on the leaked gas from the leakage location through the flexible hose 12. The term draw is intended to mean that the leaked gas is moved towards the drum 16 during operation of the apparatus 10 through the creation of an exhaust flow, depicted by arrows A in FIG. 2, in the containment and scrubbing apparatus 10. The exhaust flow progresses from the leakage location to the flexible hose 12 through the drum 16 and scrubbing media 34 and exits the containment and scrubbing apparatus 10 out the vent holes 26.

As shown in FIG. 2, the scrubbing media 34 rests on a screen 36 and a perforated plate 38 which support the scrubbing media 34 while allowing exhaust flow to pass through. During operation, when the leaked gas progresses through the scrubbing media 34, toxic or corrosive components thereof are irreversibly reacted or adsorbed by the scrubbing media 34 to render them harmless to humans or the environment leaving only clean gas in the exhaust flow. Cleaned gas exits through the vent holes 26 at the bottom of the drum 16.

Between uses, the cover bolt 20 and clamp 22 may be loosened to remove the cover 24 to expose the scrubbing media 34. In this way, depleted scrubbing media 34 may be replaced. Similarly, where a leaked gas requires a different scrubbing media 34 than that stored in the drum 16, the scrubbing media may be easily changed.

The flexible hose 12 may be manufactured of any material which is inert to or able to safely contain the specific toxic or corrosive gases during passage through it. Examples of such materials include wire reinforced vinyl tubing, polyvinyl chloride tubing, polyethylene tubing or aluminum tubing. It is important to choose a tubing material which is safe for the specific leaked gas to be contained. For example, with acid type gases, certain materials such as wire reinforced vinyl may corrode, thus decreasing the effectiveness of the apparatus. For these acid gases, polyvinyl chloride is suitable. Choosing an appropriate tubing material should be based on factors including strength, flexibility, durability, resistance to corrosion and cost.

The drum 16 may be manufactured of any material which will be inert to or safely contain the gases which are to be cleaned therein. Examples of suitable materials for manufacture of the drum include carbon steel or stainless steel. With acid-type gases, it may be desirable to manufacture the drum 16 from materials having increased corrosion resistance, for example, polyvinyl chloride.

The connection means between the flexible hose 12 and the air operated exhauster 14 may be a sheath or threaded connection or any means which provides a tight and secure seal and is resistant to the leaked gas.

The attachment means for attachably connecting the gas passageway to the gas leak location may be any suitable means for securely connecting a hose to the material having a leak. Thus, where the leak is on a gas cylinder valve, the attachment means should significantly surround the gas cylinder valve. Similarly, where the leak is on a pipe containing toxic gas, the attachment means should provide for surrounding the leaking portion of the pipe. However, provision should be made for atmospheric air or other air to enter the gas passageway during operation to allow for draw through the gas passageway. If a tight seal is made around the leak, the possibility exists that no draw will be created on the leaked gas through the gas passageway, thus decreasing the effectiveness of the apparatus.

The gas suction means may generally comprise any method of drawing the leaked gas through the gas passageway 12 and into the drum 16. Such means include any art known mechanisms for creating suction such as industrial electric or battery operated vacuums or other means which may be used to create air flow. Preferably, the gas suction means comprises an air operated exhauster 14, wherein a supply of clean, high-pressure purge gas is forced into the air operated exhauster 14 to produce draw or suction from the gas leak through the system. Most preferably, the purge gas comprises a non-flammable gas, for example nitrogen, helium or argon. Supplies of suitable purge gas for operating the air operated exhauster 14 can be readily found in many manufacturing facilities in the form of pressurized air lines which may be attached to the air operated exhauster 14. Alternatively, a separate gas cylinder filled with a suitable purge gas may be brought to the leakage site and connected to the air operated exhauster 14, thus eliminating altogether the need for supplies at the leakage site.

It may be necessary to adjust exhaust flow to accommodate the specific application for which the present invention is used. For example, in some chemical reactions between leaked gas and scrubbing media 34, residence time of the leaked gas with the scrubbing media is critical. Moreover, the time necessary for a particular chemical reaction between scrubbing media and leaked gas may vary depending on the media used, the gas leaked and the conditions under which the leak is to be contained. The flow of purge air through the air operated exhauster 14 may be adjusted to vary the vacuum level, and thus vary the draw through the drum 16 and scrubbing media 34. By varying the draw in this way, an exhaust rate may be determined at which the leaked gas in the cleaned air exiting the system is below a desired level. Detection of the level of leaked gas may be performed with any portable detection known for such purposes. In this way, the flow rate may be easily and quickly adjusted to ensure efficient scrubbing and containment by an on-site technician.

Using a non-flammable gas as a purge gas decreases the risk of explosion where the leaked gas is flammable or explosive. By contrast, if an electrical motor driven vacuum is used to create suction, the danger exists that an open spark motor generally used to power such a vacuum may cause a flammable leaked gas to explode. An additional drawback of an electrically driven vacuum is the need for an electricity supply at the on-site location of the leakage.

The scrubbing media 34 used is generally a dry scrubbing media which reacts with the leaked gas to render it harmless. The scrubbing media 34 may be an adsorbent or a chemically reactive substance which converts or removes the toxic component of the leaked gas leaving cleaned air. The nature of the scrubbing media 34 in the drum 16 is generally chosen based on the nature of the leaked gas. Different scrubbing media 34 is preferred for different types of leaked gases. For example, acid gases, hydride gases and fluoride gases are preferably scrubbed with different scrubbing media.

Leakage of an acid gas such as, for example, chlorine, dichlorosilane, boron trichloride, hydrogen chloride, silicon tetrachloride or trichlorosilane is preferably contained and scrubbed with scrubbing media comprising a high surface area carbon or alumina pellets impregnated with an alkali metal. For example, scrubbing media comprising sodium hydroxide may be used to scrub chlorine gas, because of the conversion into sodium chloride.

Leakage of a hydride gas, for example, arsine, germane, phosphine, hydrogen sulfide, hydrogen selenide, phosphine or organometallic mixtures, such as dimethyl zinc or diethyl telluride, is preferably contained and scrubbed with media comprising a high surface area carbon impregnated with oxides of copper or aluminum impregnated with potassium permangenate. These materials react with the hydride gases to form their corresponding oxides.

Leakage of a fluoride gas, such as, for example, boron trifluoride, hydrogen fluoride, silicon tetrafluoride or tungsten hexafluoride, is preferably scrubbed with media comprising barium oxide or calcium oxide pellets. The barium oxide or calcium oxide pellets are fluorinated by the fluorides into insoluble salts.

Combinations of scrubbing media 34 may be included in the drum 16 if the containment and scrubbing apparatus 10 is intended to be on constant standby for rapid control of potential leaks of a variety of gases. In such a situation, it is necessary to ensure that chemical reactions which occur between the leaked gas and the scrubbing media 34 do not create undesirable products due to the presence of multiple scrubbing media.

The scrubbing media 34 provides a mechanism for cleaning the toxic or harmful component of a particular gas flowing from a leakage location. By cleaning of the gas is intended to mean that the gas exiting the system differs from the leaked gas entering the scrubbing media 34 by not including a significant amount of the toxic or corrosive component of the leaked gas. As a result, the gas exiting the system is clean gas suitable for release into the atmosphere or environment. Cleaning is due to reactions between the toxic or corrosive components of the leaked gas with the scrubbing media 34. These reactions may include adsorption of the toxic or corrosive component to an element of the scrubbing media 34, reaction or conversion of the toxic or corrosive component with an element of the scrubbing media into benign form, Or any other method of irreversibly altering or immobilizing dangerous components in the leaked gas so that they are safe to humans and thus for release into the atmosphere. After the leak has been permanently contained or repaired, the harmful component of the gases which has been adsorbed or impregnated into the scrubbing media may be transported to a treatment location for safe disposal.

Preferably the scrubbing media 34 includes a dry indicator reagent which provides a detectable signal upon consumption of the scrubbing media. A suitable use of indicator reagent would be to intermix the indicator reagent with the scrubbing media. Suitable viewing means should then be incorporated in the drum 16 to allow viewing of the color of the indicator reagent. For example, a clear plexiglass or glass viewstrip extending the length of drum 16 would allow viewing of the indicator reagent. Dry indicator reagents depend on the scrubbing media used and gas to be contained. For example, when sodium hydroxide is used to scrub leaking chlorine gas, a dry indicator comprising a mixture of hydrated lime, sodium hydroxide and potassium hydroxide impregnated with ethyl violet indicator (sold commercially as SODASORB) will turn from white to a grey/purple color when the dry scrubbing material is spent.

As another possible indicator reagent, when the treated gas includes a hydride gas and the scrubbing media comprises oxides of copper or aluminum impregnated with potassium permangenate, the indicator reagent may comprise potassium permangenate impregnated alumina which changes color from purple to brown when the dry scrubbing material is spent. Other indicator reagents are possible and include any art-recognized indicator reagent for the purpose of detecting depletion of a scrubbing media.

The invention will be further exemplified by the following examples which are intended solely to illustrate, and not limit, the invention described herein.

EXAMPLE 1

Containment And Scrubbing Of Arsine/Hydrogen Gas From A Leaking Cylinder

Figure 3A:
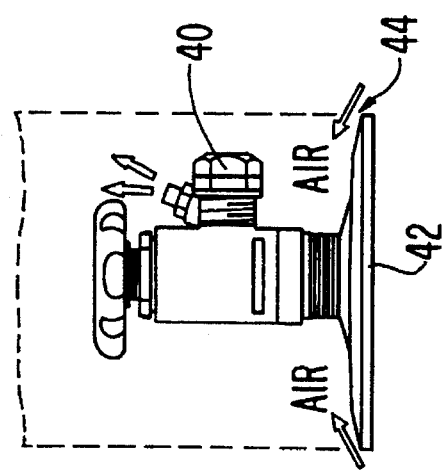
FIG. 3a illustrates an exploded view of the leaking valve.
Figure 3:
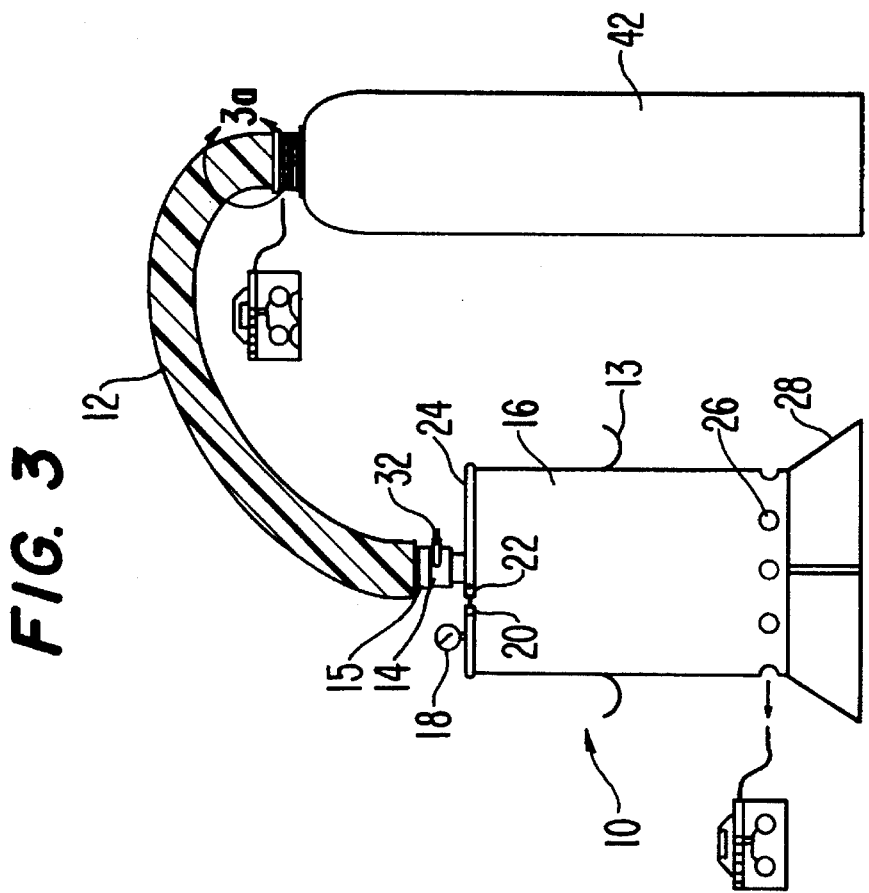
FIG. 3 illustrates the operation of the containment and scrubbing apparatus according to the present invention in containing a leaking gas cylinder on-site.

Operation of the present invention to contain and scrub gas leaking from a cylinder of 1000 ppm arsine/hydrogen is illustrated in FIG. 3. As shown in FIG. 3, a 3 inch flexible duct 12 was slipped over a leaking valve 40 (shown in exploded cross-section) on a cylinder 42 filled with hydrogen/arsine which was leaking at greater than 10 cc$^3$/minute. The duct 12 was fitted over the cylinder 42 in such a way that air was allowed to enter the duct 12 at an opening 44. The duct 12 was connected to the containment and scrubbing apparatus 10 at the air operated exhauster 14.

Nitrogen was introduced as purge gas via quick connect valve 32 at a pressure of 40 psig. Nitrogen consumption was measured at 8.25 ft$^3$/minute. The pressure in the drum was less than 1 inch of water column pressure. The exhaust flow at 40 psig of nitrogen in the air operated exhauster was 110 ft$^3$/minute, and total flow at the vent holes was 132 ft$^3$/minute.

The drum 16 was filled with 21 lbs of a scrubbing media (not shown) of FCA® Charcoal (impregnated charcoal) to a depth of 6 inches.

Testing of the exhausted air from the vent holes at 2200 ft/min determined that the level of arsine/hydrogen in the exhausted air was not detectable, and thus less than 5 ppb.

EXAMPLE 2

Three-Stage Scrubbing And Containment Of Gas From A Leaking. Cylinder On-Site

Figure 4:
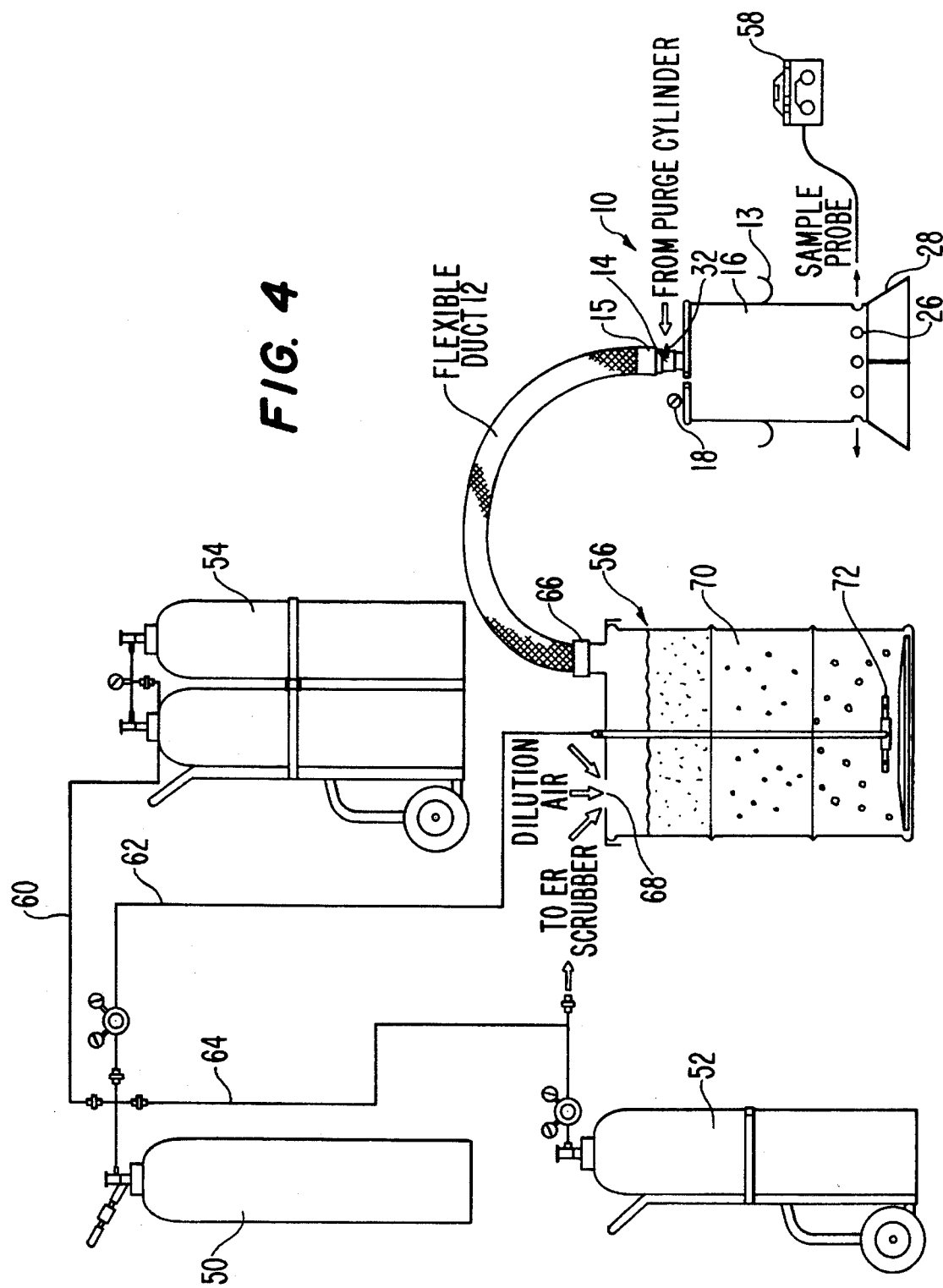
FIG. 4 illustrates the use of the containment and scrubbing apparatus according to the present invention in combination with additional methods of cleaning gas from a leaking cylinder.

The present invention may be used in conjunction with other methods for containing and scrubbing toxic or corrosive gases to advantageously improve the overall control efforts. An alternative embodiment of such a use of the present invention is provided in FIG. 4. As shown in FIG. 4, a leaking cylinder of gas 50 is illustrated. Gas lines, or flex lines 60,62,64, are run from the leaking cylinder to a cylinder of purge nitrogen 52, a cascade cylinder 54 and a bubbler 56.

In a first stage, gas may be removed from the leaking cylinder through gas line 60 into the cascade cylinder 54 to reduce the pressure of the gas in the leaking cylinder 50. In this way, much of the gas in the cylinder, up to 80–85% in some cases, may be safely contained in an undamaged cylinder for later disposal. Upon completion of this stage, the lines may be flushed with purge nitrogen from gas line 64 to ensure that no leaked gas escapes.

Subsequently or simultaneously, the gas from the leak may be fed through gas line 62 to a bubbler 56 which includes a chemical liquid, for example potassium permangenate or sodium hydroxide, which reacts with the leaking gas. The leaked gas is drawn through the gas line 62 to the bubbler 56 and released at the bottom of the tank of liquid 70 from a bubbling means 72, so that it bubbles to the top. As the leaked gas bubbles to the top of the tank of liquid 70, it reacts with the chemicals in the liquid to remove a portion of the harmful components of the leaked gas. The bubbler 56 comprises an opening 68 which allows the entrance of dilution air during operation. The choice of the chemical liquid in the bubbler 56 will depend on the nature of the leaked gas. The bubbler 56 acts as a first stage for removing harmful components of the leaked gas. After passing through the bubbler 56, the gas flow is directed to the containment and scrubbing apparatus 10 of the present invention through a duct 12 to further scrub and contain toxic or corrosive elements of the leaked gas. The duct 12 is attached to an opening on the bubbler 56 at one end 66 by an attachment means.

The partially cleaned gas emitted from the bubbler 56 is drawn through the duct 12 by an air operated exhauster 14 which creates exhaust flow through input of nitrogen from the purge nitrogen cylinder 52 through a gas line (not shown). In the containment and scrubbing apparatus 10, the gas is further cleaned and scrubbed by the scrubbing media (not shown) in the drum 16. The cleaned air is then exhausted through the vent holes 26 where the level of leaked gas is measured by a sample probe of a gas detector 58. The exhaust flow through the containment and scrubbing apparatus 10 may be adjusted by adjusting the flow of purge air through the quick connect 32 of the air operated exhauster 14 to ensure that the air exiting the vent holes 26 is free of harmful content.

The use of these operations in concert with each other provides for a complete and rapid response to an emergency situation involving leaking gas cylinders. In this way, the entirety of the gas in the leaking cylinder is safely and efficiently contained and cleaned.

An advantage of the present invention is that the scrubbing media may be replaced or exchanged quickly based on the specific nature of the gas leakage emergency. It is also possible to include within the drum a variety of scrubbing media which each react with different gases, thus allowing rapid deployment of the containment and scrubbing apparatus to a variety of leakage situations without the delay caused by changing the scrubbing media.

Another advantage of the present invention is that the containment and scrubbing apparatus may be prepackaged as a kit for an emergency response team or other trained personnel which can be conveniently moved to the location of the leaking gas cylinder or piping system.

Yet another advantage of the present invention is that the present system for cleaning toxic or corrosive gases is portable and self-contained, thus allowing for use at virtually any location where a gas leak occurs.

Yet another advantage of the present invention is that, by using a non-flammable gas as a purge gas to provide draw on the leaked gas, it is possible to dramatically reduce the possibility of explosion or fire where the leaked gas is flammable.

Of course, it should be understood that a wide range of changes and modifications can be made to the preferred embodiments described above. It is therefore intended that the foregoing detailed description be understood that it is the following claims, including all equivalents, which are intended to define the scope of this invention.

We claim:

1. A method for containing and scrubbing leaked gas flowing from a gas leakage location comprising:

providing a gas passageway which is attachable to said gas leakage location at an end of said passageway;

providing a gas suction means for drawing leaked gas through said gas passageway;

providing a drum attached to said gas passageway at an end opposite said end which is attachable to said gas leakage location, said drum comprising therein a scrubbing media;

wherein said gas passageway is attached to a gas leakage location and said gas suction means draws said leaked gas through said gas passageway and through said drum comprising said scrubbing media thereby cleaning said leaked gas to render it safe for environmental release.

2. The method of claim 1, wherein said leaked gas comprises chlorine, dichlorosilane, boron trichloride, hydrogen chloride, silicon tetrachloride, trichlorosilane, arsine, germane, hydrogen sulfide, hydrogen selenide, phosphine, boron trifluoride, hydrogen fluoride, silicon tetrafluoride, tungsten hexafluoride or an organometallic gas mixture.

3. The method of claim 1, wherein said scrubbing media comprises a high-surface area carbon impregnated with alkali metal hydroxide, high surface area alumina impregnated with alkali metal hydroxide, high surface area carbon impregnated with oxides of copper, high surface area alumina impregnated with potassium permangenate, barium oxide pellets, calcium oxide pellets or a mixture thereof.

4. The method of claim 1, wherein said gas suction means comprises an air operated exhauster.

5. The method of claim 4, wherein said air operated exhauster comprises means for inputting an adjustable flow of non-flammable gas into said air operated exhauster, said adjustable flow of non-flammable gas resulting in varying an exhaust flow of leaked gas through said gas passageway to ensure that said leaked gas is cleaned to a predetermined level by said scrubbing media.

6. The method of claim 5, wherein said non-flammable gas comprises nitrogen, argon or helium.

7. An apparatus for containing and scrubbing a leaked gas flowing from a gas leakage location comprising:

a gas passageway which is attachable to said gas leakage location at an end of said passageway;

a gas suction means for drawing leaked gas through said gas passageway;

a drum attached to said gas passageway at an end opposite said end which is attachable to said gas leakage location, said drum comprising therein a scrubbing media.

8. The apparatus of claim 7, wherein said gas passageway is a flexible hose.

9. The apparatus of claim 7, wherein said gas suction means is an air operated exhauster.

10. The apparatus of claim 9, wherein said air operated exhauster draws said leaked gas through said gas passageway by inputting a non-flammable purge gas into said air operated exhauster.

11. The apparatus of claim 10, wherein said non-flammable purge gas comprises nitrogen, argon or helium.

12. The apparatus of claim 9, wherein said air operated exhauster comprises a manually variable flow of non-flammable purge gas through a connection to said gas passageway at the opposite end of said gas passageway from said end which is attachable to said gas leakage location, said variable flow allowing for adjusting the exhaust flow of leaked gas through said gas passageway.

13. The apparatus according to claim 9, wherein the air operated exhauster extends from the top of the drum and includes a connection means for connection to an external source of compressed purge gas.

14. The apparatus of claim 7, wherein said scrubbing media comprises a high-surface area carbon or high-surface area alumina pellet which is impregnated with an alkali metal.

15. The apparatus of claim 14, wherein said alkali metal comprises sodium hydroxide.

16. The apparatus of claim 7, wherein said scrubbing media comprises a high-surface area carbon impregnated with oxides of copper or alumina impregnated with potassium permangenate.

17. The apparatus of claim 7, wherein said scrubbing media comprises barium oxide or calcium oxide pellets.

18. The apparatus of claim 7, wherein said scrubbing means comprises a high surface area carbon, a high surface alumina impregnated with an alkali metal, a high surface area carbon impregnated with oxides of copper, a high surface area alumina impregnated with potassium permangenate, barium oxide, calcium oxide or mixtures thereof.

19. The apparatus of claim 7, wherein said gas passageway is capable of attaching to a gas pipe which has a leak thereon.

20. The apparatus of claim 7, wherein said gas passageway is capable of attachment to a gas cylinder having a leak thereon.

\* \* \* \* \*